(12) United States Patent
Candelore

(10) Patent No.: US 7,555,464 B2
(45) Date of Patent: Jun. 30, 2009

(54) MULTIPLE DRM MANAGEMENT

(75) Inventor: Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 353 days.

(21) Appl. No.: 11/365,564

(22) Filed: Mar. 1, 2006

(65) Prior Publication Data

US 2007/0208668 A1    Sep. 6, 2007

(51) Int. Cl.
*G06Q 99/00* (2006.01)
(52) U.S. Cl. .............................. 705/59; 705/50; 705/51; 705/52; 705/54; 705/56; 705/57; 705/71
(58) Field of Classification Search .............. 705/50–79
See application file for complete search history.

(56) References Cited

U.S. PATENT DOCUMENTS

| | | | |
|---|---|---|---|
| 3,852,519 | A | 12/1974 | Court |
| 4,381,519 | A | 4/1983 | Wilkinson et al. |
| 4,419,693 | A | 12/1983 | Wilkinson |
| 4,521,853 | A | 6/1985 | Guttag |
| 4,634,808 | A | 1/1987 | Moerder |
| 4,700,387 | A | 10/1987 | Hirata |

(Continued)

FOREIGN PATENT DOCUMENTS

CA            2389247          5/2001

(Continued)

OTHER PUBLICATIONS

Muller, "Desktop Encyclopedia of the Internet", 1999, Artech House Inc., Norwood, MA, all pages.*

(Continued)

*Primary Examiner*—Andrew J. Fischer
*Assistant Examiner*—Jacob C Coppola
(74) *Attorney, Agent, or Firm*—Miller Patent Services; Jerry A. Miller

(57) ABSTRACT

In one embodiment, a method for enabling a single assembly of content to be played on a plurality of player devices, each having at least one available digital rights management (DRM) algorithm involves registering a plurality of player devices associated with a client with a database registry, wherein each of the plurality of player devices is enabled to play content using at least one (DRM) algorithm when an appropriate license has been secured; upon registering the plurality of player devices, registering the one or more associated DRM algorithms with each player device; upon receipt of a request for delivery of specified content to the client, searching the database registry for a list of compatible devices and compatible DRM algorithms for the content; obtaining a plurality of licenses to the content, at least one for each DRM algorithm for the player devices associated with the client; obtaining the content from a content provider; and encrypting the content under each of the DRM algorithms to produce multiple DRM selectively encrypted content, wherein, the unencrypted segments of content are assembled together with each of the DRM encrypted duplicate selected segments to produce a single unified content assembly that can be played on any of the player devices. This abstract is not to be considered limiting, since other embodiments may deviate from the features described in this abstract.

24 Claims, 8 Drawing Sheets

U.S. PATENT DOCUMENTS

| | | |
|---|---|---|
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,964,126 A | 10/1990 | Musicus et al. |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata et al. |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,477,263 A | 12/1995 | O'Callaghan et al. |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,594,507 A | 1/1997 | Hoarty |
| 5,598,214 A | 1/1997 | Kondo et al. |
| 5,600,378 A | 2/1997 | Wasilewski |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,866 A | 5/1997 | Carrubba et al. |
| 5,629,981 A | 5/1997 | Nerlikar |
| 5,652,795 A | 7/1997 | Dillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimodo et al. |
| 5,717,814 A | 2/1998 | Abecassis |
| 5,726,702 A | 3/1998 | Hamaguchi et al. |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachetti et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,761,180 A | 6/1998 | Murabayashi et al. |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,838,873 A | 11/1998 | Blatter et al. |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasilewski et al. |
| 5,894,320 A | 4/1999 | Vancelette |
| 5,894,516 A | 4/1999 | Brandenburg |
| 5,915,018 A | 6/1999 | Aucsmith |
| 5,917,830 A | 6/1999 | Chen et al. |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |
| 5,940,738 A | 8/1999 | Rao |
| 5,943,605 A | 8/1999 | Koepele, Jr. |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. |
| 5,973,722 A | 10/1999 | Wakai et al. |
| 5,973,726 A | 10/1999 | Iijima et al. |
| 5,999,622 A | 12/1999 | Yasukawa et al. |

| Patent | Date | Inventor |
|---|---|---|
| 5,999,698 A | 12/1999 | Nakai et al. |
| 6,005,561 A | 12/1999 | Hawkins et al. |
| 6,005,940 A | 12/1999 | Kulinets |
| 6,011,849 A | 1/2000 | Orrin |
| 6,012,144 A | 1/2000 | Pickett |
| 6,016,348 A | 1/2000 | Blatter et al. |
| 6,021,199 A | 2/2000 | Ishibashi |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobsson |
| 6,055,314 A | 4/2000 | Spies et al. |
| 6,055,315 A | 4/2000 | Doyle et al. |
| 6,057,872 A | 5/2000 | Candelore |
| 6,058,186 A | 5/2000 | Enari |
| 6,058,192 A | 5/2000 | Guralnick et al. |
| 6,061,451 A | 5/2000 | Muratani et al. |
| 6,064,748 A | 5/2000 | Hogan |
| 6,065,050 A | 5/2000 | DeMoney |
| 6,069,647 A | 5/2000 | Sullivan et al. |
| 6,070,245 A | 5/2000 | Murphy, Jr. et al. |
| 6,072,872 A | 6/2000 | Chang et al. |
| 6,072,873 A | 6/2000 | Bewick |
| 6,073,122 A | 6/2000 | Wool |
| 6,088,450 A | 7/2000 | Davis et al. |
| 6,105,134 A | 8/2000 | Pinder et al. |
| 6,108,422 A | 8/2000 | Newby et al. |
| 6,115,821 A | 9/2000 | Newby et al. |
| 6,118,873 A | 9/2000 | Lotspiech et al. |
| 6,134,237 A | 10/2000 | Brailean et al. |
| 6,134,551 A | 10/2000 | Aucsmith |
| 6,138,237 A | 10/2000 | Ruben et al. |
| 6,148,082 A | 11/2000 | Slattery et al. |
| 6,154,206 A | 11/2000 | Ludtke |
| 6,157,719 A | 12/2000 | Wasilewski et al. |
| 6,181,334 B1 | 1/2001 | Freeman et al. |
| 6,185,369 B1 | 2/2001 | Ko et al. |
| 6,185,546 B1 | 2/2001 | Davis |
| 6,189,096 B1 | 2/2001 | Haverty |
| 6,192,131 B1 | 2/2001 | Geer, Jr. et al. |
| 6,199,053 B1 | 3/2001 | Herbert et al. |
| 6,201,927 B1 | 3/2001 | Comer |
| 6,204,843 B1 | 3/2001 | Freeman et al. |
| 6,209,098 B1 | 3/2001 | Davis |
| 6,215,484 B1 | 4/2001 | Freeman et al. |
| 6,219,358 B1 | 4/2001 | Pinder et al. |
| 6,222,924 B1 | 4/2001 | Salomaki |
| 6,223,290 B1 | 4/2001 | Larsen et al. |
| 6,226,618 B1 | 5/2001 | Downs et al. |
| 6,229,895 B1 | 5/2001 | Son et al. |
| 6,230,194 B1 | 5/2001 | Frailong et al. |
| 6,230,266 B1 | 5/2001 | Perlman et al. |
| 6,236,727 B1 | 5/2001 | Ciacelli et al. |
| 6,240,553 B1 | 5/2001 | Son et al. |
| 6,246,720 B1 | 6/2001 | Kutner et al. |
| 6,256,747 B1 | 7/2001 | Inohara et al. |
| 6,263,506 B1 | 7/2001 | Ezaki et al. |
| 6,266,416 B1 | 7/2001 | Sigbjornsen et al. |
| 6,266,480 B1 | 7/2001 | Ezaki et al. |
| 6,272,538 B1 | 8/2001 | Holden et al. |
| 6,278,783 B1 | 8/2001 | Kocher et al. |
| 6,289,455 B1 | 9/2001 | Kocher et al. |
| 6,292,568 B1 | 9/2001 | Atkins, III et al. |
| 6,292,892 B1 | 9/2001 | Davis |
| 6,307,939 B1 | 10/2001 | Vigarie |
| 6,311,012 B1 | 10/2001 | Cho et al. |
| 6,314,111 B1 | 11/2001 | Nandikonda et al. |
| 6,324,288 B1 | 11/2001 | Hoffman |
| 6,327,421 B1 | 12/2001 | Tiwari et al. |
| 6,351,538 B1 | 2/2002 | Uz |
| 6,351,813 B1 | 2/2002 | Mooney et al. |
| 6,377,589 B1 | 4/2002 | Knight et al. |
| 6,378,130 B1 | 4/2002 | Adams |
| 6,389,533 B1 | 5/2002 | Davis et al. |
| 6,389,537 B1 | 5/2002 | Davis et al. |
| 6,415,031 B1 | 7/2002 | Colligan et al. |
| 6,415,101 B1 | 7/2002 | deCarmo et al. |
| 6,418,169 B1 | 7/2002 | Datari |
| 6,424,717 B1 | 7/2002 | Pinder et al. |
| 6,430,361 B2 | 8/2002 | Lee |
| 6,445,738 B1 | 9/2002 | Zdepski et al. |
| 6,449,718 B1 | 9/2002 | Rucklidge et al. |
| 6,452,923 B1 | 9/2002 | Gerszberg et al. |
| 6,453,115 B1 | 9/2002 | Boyle |
| 6,453,116 B1 | 9/2002 | Ando et al. |
| 6,456,985 B1 | 9/2002 | Ohtsuka |
| 6,459,427 B1 | 10/2002 | Mao et al. |
| 6,466,671 B1 | 10/2002 | Maillard et al. |
| 6,480,551 B1 | 11/2002 | Ohishi et al. |
| 6,490,728 B1 | 12/2002 | Kitazato et al. |
| 6,505,032 B1 | 1/2003 | McCorkle et al. |
| 6,505,299 B1 | 1/2003 | Zeng et al. |
| 6,510,554 B1 | 1/2003 | Gordon et al. |
| 6,519,693 B1 | 2/2003 | Debey |
| 6,526,144 B2 | 2/2003 | Markandey et al. |
| 6,529,526 B1 | 3/2003 | Schneidewend |
| 6,543,053 B1 | 4/2003 | Li et al. |
| 6,549,229 B1 | 4/2003 | Kirby et al. |
| 6,550,008 B1 | 4/2003 | Zhang et al. |
| 6,557,031 B1 | 4/2003 | Mimura et al. |
| 6,587,561 B1 | 7/2003 | Sered et al. |
| 6,590,979 B1 | 7/2003 | Ryan |
| 6,640,145 B2 | 10/2003 | Hoffberg et al. |
| 6,640,305 B2 | 10/2003 | Kocher et al. |
| 6,643,298 B1 | 11/2003 | Brunheroto et al. |
| 6,650,754 B2 | 11/2003 | Akiyama et al. |
| 6,654,389 B1 | 11/2003 | Brunheroto et al. |
| 6,678,740 B1 | 1/2004 | Rakib et al. |
| 6,681,326 B2 | 1/2004 | Son et al. |
| 6,684,250 B2 | 1/2004 | Anderson et al. |
| 6,697,489 B1 | 2/2004 | Candelore |
| 6,697,944 B1 | 2/2004 | Jones et al. |
| 6,707,696 B1 | 3/2004 | Turner et al. |
| 6,714,650 B1 | 3/2004 | Maillard et al. |
| 6,754,276 B1 | 6/2004 | Harumoto et al. |
| 6,772,340 B1 | 8/2004 | Peinado et al. |
| 6,788,690 B2 | 9/2004 | Harri |
| 6,788,882 B1 | 9/2004 | Geer et al. |
| 6,826,185 B1 | 11/2004 | Montanaro et al. |
| 6,853,728 B1 | 2/2005 | Kahn et al. |
| 6,883,050 B1 | 4/2005 | Safadi |
| 6,891,565 B1 | 5/2005 | Dietrich |
| 6,895,128 B2 | 5/2005 | Bohnenkamp |
| 6,904,520 B1 | 6/2005 | Rosset et al. |
| 6,917,684 B1 | 7/2005 | Tatebayashi et al. |
| 6,925,180 B2 | 8/2005 | Iwamura |
| 6,938,162 B1 | 8/2005 | Nagai et al. |
| 6,976,166 B2 | 12/2005 | Herley et al. |
| 6,988,238 B1 | 1/2006 | Kovacevic et al. |
| 7,039,802 B1 | 5/2006 | Eskicioglu et al. |
| 7,039,938 B2 | 5/2006 | Candelore |
| 7,055,166 B1 | 5/2006 | Logan et al. |
| 7,065,213 B2 | 6/2006 | Pinder |
| 7,079,752 B1 | 7/2006 | Leyendecker |
| 7,089,579 B1 | 8/2006 | Mao et al. |
| 7,096,481 B1 | 8/2006 | Forecast et al. |
| 7,096,487 B1 | 8/2006 | Gordon et al. |
| 7,110,659 B2 | 9/2006 | Fujie et al. |
| 7,120,250 B2 | 10/2006 | Candelore |
| 7,124,303 B2 | 10/2006 | Candelore |
| 7,127,619 B2 | 10/2006 | Unger et al. |
| 7,139,398 B2 | 11/2006 | Candelore et al. |
| 7,146,007 B1 | 12/2006 | Maruo et al. |
| 7,151,831 B2 | 12/2006 | Candelore et al. |
| 7,151,833 B2 | 12/2006 | Candelore et al. |
| 7,155,012 B2 | 12/2006 | Candelore et al. |

| | | |
|---|---|---|
| 7,158,185 B2 | 1/2007 | Gastaldi |
| 7,194,758 B1 | 3/2007 | Waki et al. |
| 7,221,706 B2 | 5/2007 | Zhao et al. |
| 7,292,692 B2 | 11/2007 | Bonan et al. |
| 7,336,785 B1 | 2/2008 | Lu et al. |
| 7,391,866 B2 | 6/2008 | Fukami et al. |
| 2001/0013123 A1 | 8/2001 | Freeman et al. |
| 2001/0030959 A1 | 10/2001 | Ozawa et al. |
| 2001/0036271 A1 | 11/2001 | Javed |
| 2001/0051007 A1 | 12/2001 | Teshima |
| 2002/0003881 A1 | 1/2002 | Reitmeier et al. |
| 2002/0021805 A1 | 2/2002 | Schumann et al. |
| 2002/0026587 A1 | 2/2002 | Talstra et al. |
| 2002/0044558 A1 | 4/2002 | Gobbi et al. |
| 2002/0046406 A1 | 4/2002 | Chelehmal et al. |
| 2002/0047915 A1 | 4/2002 | Misu |
| 2002/0059425 A1 | 5/2002 | Belfiore et al. |
| 2002/0066101 A1 | 5/2002 | Gordon et al. |
| 2002/0067436 A1 | 6/2002 | Shirahama et al. |
| 2002/0083317 A1 | 6/2002 | Ohta et al. |
| 2002/0083438 A1 | 6/2002 | So et al. |
| 2002/0083439 A1 | 6/2002 | Eldering |
| 2002/0097322 A1 | 7/2002 | Monroe et al. |
| 2002/0100054 A1 | 7/2002 | Feinberg et al. |
| 2002/0108035 A1 | 8/2002 | Herley et al. |
| 2002/0109707 A1 | 8/2002 | Lao et al. |
| 2002/0116705 A1 | 8/2002 | Perlman et al. |
| 2002/0126890 A1 | 9/2002 | Katayama et al. |
| 2002/0129243 A1 | 9/2002 | Nanjundiah |
| 2002/0144116 A1 | 10/2002 | Giobbi |
| 2002/0144260 A1 | 10/2002 | Devara |
| 2002/0150239 A1 | 10/2002 | Carny et al. |
| 2002/0157115 A1 | 10/2002 | Lu |
| 2002/0164022 A1 | 11/2002 | Strasser et al. |
| 2002/0170053 A1 | 11/2002 | Peterka et al. |
| 2002/0184506 A1 | 12/2002 | Perlman |
| 2002/0194589 A1 | 12/2002 | Cristofalo et al. |
| 2002/0194613 A1 | 12/2002 | Unger |
| 2002/0196939 A1 | 12/2002 | Unger et al. |
| 2003/0002854 A1 | 1/2003 | Belknap et al. |
| 2003/0009669 A1 | 1/2003 | White et al. |
| 2003/0012286 A1 | 1/2003 | Ishtiaq et al. |
| 2003/0021412 A1 | 1/2003 | Candelore et al. |
| 2003/0026423 A1 | 2/2003 | Unger et al. |
| 2003/0028879 A1 | 2/2003 | Gordon et al. |
| 2003/0034997 A1 | 2/2003 | McKain et al. |
| 2003/0035482 A1 | 2/2003 | Klompenhouwer et al. |
| 2003/0035540 A1 | 2/2003 | Freeman et al. |
| 2003/0035543 A1 | 2/2003 | Gillon |
| 2003/0046687 A1 | 3/2003 | Hodges et al. |
| 2003/0059047 A1 | 3/2003 | Iwamura |
| 2003/0063615 A1 | 4/2003 | Luoma et al. |
| 2003/0072555 A1 | 4/2003 | Yap et al. |
| 2003/0077071 A1 | 4/2003 | Lin et al. |
| 2003/0081630 A1 | 5/2003 | Mowery et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0112333 A1 | 6/2003 | Chen et al. |
| 2003/0118243 A1 | 6/2003 | Sezer et al. |
| 2003/0123664 A1 | 7/2003 | Pedlow, Jr. et al. |
| 2003/0123849 A1 | 7/2003 | Nallur et al. |
| 2003/0126086 A1 | 7/2003 | Safadi |
| 2003/0133570 A1 | 7/2003 | Candelore et al. |
| 2003/0140257 A1 | 7/2003 | Peterka et al. |
| 2003/0152224 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0174844 A1 | 9/2003 | Candelore |
| 2003/0188154 A1 | 10/2003 | Dallard |
| 2003/0188164 A1 | 10/2003 | Okimoto et al. |
| 2003/0190054 A1 | 10/2003 | Troyansky et al. |
| 2003/0193973 A1 | 10/2003 | Takashimizu et al. |
| 2003/0198223 A1 | 10/2003 | Mack et al. |
| 2003/0204717 A1 | 10/2003 | Kuehnel |
| 2003/0222994 A1 | 12/2003 | Dawson |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0021764 A1 | 2/2004 | Driscoll, Jr. et al. |
| 2004/0028227 A1 | 2/2004 | Yu |
| 2004/0037421 A1 | 2/2004 | Truman |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049694 A1* | 3/2004 | Candelore .................. 713/200 |
| 2004/0064688 A1 | 4/2004 | Jacobs |
| 2004/0068659 A1 | 4/2004 | Diehl |
| 2004/0073917 A1 | 4/2004 | Pedlow, Jr. et al. |
| 2004/0078575 A1 | 4/2004 | Morten et al. |
| 2004/0081333 A1 | 4/2004 | Grab et al. |
| 2004/0086127 A1 | 5/2004 | Candelore |
| 2004/0088552 A1 | 5/2004 | Candelore |
| 2004/0088558 A1 | 5/2004 | Candelore |
| 2004/0091109 A1 | 5/2004 | Son et al. |
| 2004/0100510 A1 | 5/2004 | Milic-Frayling et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0151314 A1 | 8/2004 | Candelore |
| 2004/0158721 A1 | 8/2004 | Candelore |
| 2004/0165586 A1 | 8/2004 | Read et al. |
| 2004/0172650 A1 | 9/2004 | Hawkins et al. |
| 2004/0181666 A1 | 9/2004 | Candelore |
| 2004/0187161 A1 | 9/2004 | Cao |
| 2004/0193550 A1 | 9/2004 | Siegel |
| 2004/0240668 A1 | 12/2004 | Bonan et al. |
| 2004/0247122 A1 | 12/2004 | Hobrock et al. |
| 2004/0261099 A1 | 12/2004 | Durden et al. |
| 2004/0264924 A1 | 12/2004 | Campisano et al. |
| 2004/0267602 A1 | 12/2004 | Gaydos et al. |
| 2005/0004875 A1 | 1/2005 | Kontio et al. |
| 2005/0015816 A1 | 1/2005 | Christofalo et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0071669 A1 | 3/2005 | Medvinsky et al. |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1 | 6/2005 | Genevois |
| 2005/0169473 A1 | 8/2005 | Candelore |
| 2005/0192904 A1 | 9/2005 | Candelore |
| 2005/0198586 A1 | 9/2005 | Sekiguchi et al. |
| 2005/0259813 A1 | 11/2005 | Wasilewski et al. |
| 2005/0265547 A1 | 12/2005 | Strasser et al. |
| 2005/0283797 A1 | 12/2005 | Eldering et al. |
| 2006/0015580 A1* | 1/2006 | Gabriel et al. .............. 709/219 |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0136976 A1 | 6/2006 | Coupe et al. |
| 2006/0153379 A1 | 7/2006 | Candelore et al. |
| 2006/0168616 A1 | 7/2006 | Candelore |
| 2006/0174264 A1 | 8/2006 | Candelore |

| | | | |
|---|---|---|---|
| 2006/0262926 | A1 | 11/2006 | Candelore et al. |
| 2006/0269060 | A1 | 11/2006 | Candelore et al. |

FOREIGN PATENT DOCUMENTS

| | | |
|---|---|---|
| EP | 0471373 | 2/1992 |
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0720374 | 7/1996 |
| EP | 0382764 | 4/1997 |
| EP | 0833517 | 4/1998 |
| EP | 0866615 | 9/1998 |
| EP | 1187483 | 3/2002 |
| JP | 07-046575 | 2/1995 |
| JP | 7067028 | 3/1995 |
| JP | 11243534 | 10/2002 |
| KR | 299634 | 8/2008 |
| WO | WO 86/07224 | 12/1986 |
| WO | WO 93/09525 | 5/1993 |
| WO | WO 94/10775 | 5/1994 |
| WO | WO 97/38530 | 10/1997 |
| WO | WO 00/31964 | 6/2000 |
| WO | WO 00/59203 | 10/2000 |
| WO | WO 00/70817 | 11/2000 |
| WO | WO 01/26372 | 4/2001 |
| WO | WO 01/65762 | 9/2001 |
| WO | WO 01/78386 | 10/2001 |

OTHER PUBLICATIONS

Gralla, "How the Internet Works", Millennium Edition, 1999, Que Corporation, Indianapolis, IN, all pages.*
White, "How Computers Work", Millennium Edition, 1999, Que Corporation, Indianapolis, IN, all pages.*
Derfler, "How Networks Work", Bestseller Edition, 1996, Ziff-Davis Press, Emeryville, CA, all pages.*
"A Report on Security Issues in Multimedia" by Gulwani, pp. 10-14, Apr. 30, 2000, Course Notes, Department of Computer Science and Engineering, Indian Institute of Technology Kanpur.
"Ad Agencies and Advertisers To Be Empowered with Targeted Ads Delivered by Television's Prevailing Video Servers" Article Business Section of The New York Times, Updated Thursday, Dec. 20, 2001.
"An Efficient MPEG Video Ecryption Algorithm" by Shi and Bhargava, pp. 381-386, 1998 IEEE.
"An Empirical Study of Secure MPEG Video Transmissions" by Agi and Gong, pp. 137-144, 1996, IEEE, Proceedings of SNDSS '96.
"Applying Encryption to Video Communication" by Kunkelmann, pp. 41-47, Sep. 1998, Multimedia and Security Workshop at ACM Multimedia '98. Bristol, U.K.
"Comparison of MPEG Ecryption Algorithms" by Qiao and Nahrstedt, Jan. 17, 1998, Preprint submitted to Elsevier Science.
"DVD Demystified—The Guidebook for DVD-Video and DVD-ROM" by Jim Taylor, Pub. McGraw-Hill, 1998, ISBN: 0-07-064841-7, pp. 134-147.
"Efficient Frequency Domain Video Scrambling for Content Access Control" by Zeng and Lei, Nov. 1999, In Proc. ACM Multimedia.
"Evaluation of Selective Ecryption Techniques for Secure Transmission of MPEG-Compressed Bit-Streams" by Alattar and Al-Regib, pp. IV-340 to IV-343, 1999, IEEE.
"Fast Encryption Methods for Audiovisual Data Confidentiality" by Wu and Kuo, Nov. 2000, SPIE International Symposia on Information Technologies 2000, (Boston, Ma., USA).
"Improved Selective Encryption Techniques for Secure Transmission of MPEG Video Bit-Streams" by Alattar, Al-Regib and Al-Semari, pp. 256-260, 1999, IEEE.
"Multimedia and Security Workshop at ACM Multimedia" '98. Bristol, U.K., Sep. 1998.

"Performance Study of a Selective Encryption Scheme for the Security of Networked, Real-Time Video" by Spanos and Maples, pp. 2-10, 1995, IEEE.
"Pre-Encryption Profiles—Concept Overview and Proposal", Rev. 1.2 as submitted to the Open CAS consortium on Dec. 28, 2000.
"Run-Time Performance Evaluation for a Secure MPEG System Supporting Both Selective Watermarking and Encryption" by Wu and Wu, Mar. 1, 1997, submitted to JSAC special issue on Copyright and Privacy Protection.
"Selective Encryption and Watermarking of MPEG Video (Extended Abstract)" by Wu and Wu, Feb. 17, 1997, submitted to International Conference on Image Science, Systems, and Technology, CISST'97.
"Transport Streams Insertion of Video in the Compressed Digital Domain" by SeaChange International, Web Site Literature, 2000.
"Visible World—A High Impact Approach to Customized Television Advertising" by Haberman, Dec. 2001.
Anonymous, Message Authentication with Partial Encryption, Research discosure RD 296086, Dec. 10, 1998.
Anonymous, New Digital Copy Protection Proposal Would Secure Authorized Copies, PR Newswire, Nov. 1998, pp. 1-3.
Aravind, H., et al., "Image and Video Coding Standards", AT&T Technical Journal, (Jan./Feb. 1993),67-68.
Gonzalez, R. C., et al., "Digital Image Processing", Addison Wesley Publishing Company, Inc., (1992),346-348.
Kim et al., "Bit Rate Reduction Algorithm for a Digital VCR", IEEE Transactions on Consumer Electronics, vol. 37, No. 3, (Aug. 1, 1992),267-274.
Kondo, et al., "A New Concealment Method for Digital VCRs", IEEE Visual Signal Processing and Communication, Melbourne, Australia,(Sep. 1993),20-22.
Kondo, et al., "Adaptive Dynamic Range Coding Scheme for Future HDTV Digital VTR", Sony Corporation, (1991).
Kunkelmann T. et al., A Scalable Security Architecture for Multimedia Communication Standards, Darmstard Univ. of Technology, ITO, Germany, 1997, pp. 660-661.
Laksiminath, et al., "A Dual Protocol for Scalable Secure Multicasting", 1999 International Symposium on Computers and Communication, Jul. 6-8, 1999.
Lookabaugh et al., "Selective Encryption and MPEG-2", ACM Multimedia '03, Nov. 2003.
Liu et al., Motion Vector Encryption in Multimedia Streaming, 2004, IEEE, pp. 64-71.
NHK Laboratories Note, "Error Correction, Concealment and Shuffling", No. 424, (Mar. 1994),29-44.
Park, et al., "A Simple Concealment for ATM Bursty Cell Loss", IEEE Transactions on Consumer Electronics, No. 3, (Aug. 1993),704-709.
Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.
Yip, Kun-Wah, Partial-Encryption Technique for Intellectual Property Protection of FPGA-Based Products, Dec. 15, 1999, IEEE, pp. 183-190.
Zhu, et al., "Coding and Cell-Loss Recovery in DCT-Based Packet Video", IEEE Transactions on Circuits and Systems for Video Technology, No. 3, NY,(Jun. 3, 1993).
"Passage™, Freedom to Choose", 2003, Sony Electronics Inc.
"The Long March to Interoperable Digital Rights Management" by Koenen et al., pp. 1-17, 2004, IEEE.
McCormac Hack Over Cablemodem, HackWatch Aug. 10, 1998.
"How Networks Work—Milennium Edition"—pp. 88-89, Que Corporation, 2000.
"MPEG-2 Transmission," Dr. Gorry Fairhurst, Jan. 2001.
MPEG-2 Digital Broadcast Pocket Guide vol. 6, Copyright 201 Acterna, LLC.
"MPEG-2 Compliant Trick Play Over a Digital Interface," van Gassel et al., IEEE pp. 170-171., 2002.

"How Networks Work" Derfler and Freed, Ziff-Davis Press, 1996.

"How Computers Work—Millennium Edition," Ron White, Que Corporation, 1999.

"How The Internet Works—Millennium Edition," Preston Gralla, Que Corporation, 1999.

"Desktop Encyclopedia of the Internet," Nathan J. Muller, Artech House, 1999.

* cited by examiner

MULTIPLE DRM MANAGEMENT

CROSS REFERENCE TO RELATED DOCUMENTS

This application is related to published U.S. patent applications US2004/0049694, US2005/0192904 and US2005/0169473, both to Brant L. Candelore which are hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Currently, there are a number of competing digital rights management (DRM) algorithms that incorporate encryption for protection of copyrighted material. In general, such DRM algorithms are incompatible, and, therefore, content that is protected using a particular DRM algorithm cannot be played back on a device that does not incorporate an appropriate combination of hardware and software that is compatible with such DRM algorithm. In the case of a personal computer or similar device, DRM algorithms can often be downloaded or otherwise obtained and loaded into the computer's disc drive and memory in order to permit the personal computer to operate under any given DRM algorithm. However, some devices are designed to operate exclusively with a particular DRM algorithm. Those devices may be unable to upgrade or change DRM algorithms to match a particular item of content that a user wishes to play back. Additionally, some content may not be available encrypted using a particular type of DRM that is compatible with a playback device, and some DRM algorithms may be more desirable to some users or for a particular playback device for some reason than others.

A consumer of DRM protected content may wish to have the ability to play back that content on a number of different playback hardware devices. For example, video content or movies may be played back using a personal computer, a digital video recorder, a personal digital assistant, or even a cellular telephone. The flexibility needed to provide for a playback in any of an assortment of player devices is not currently well provided for in the marketplace.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
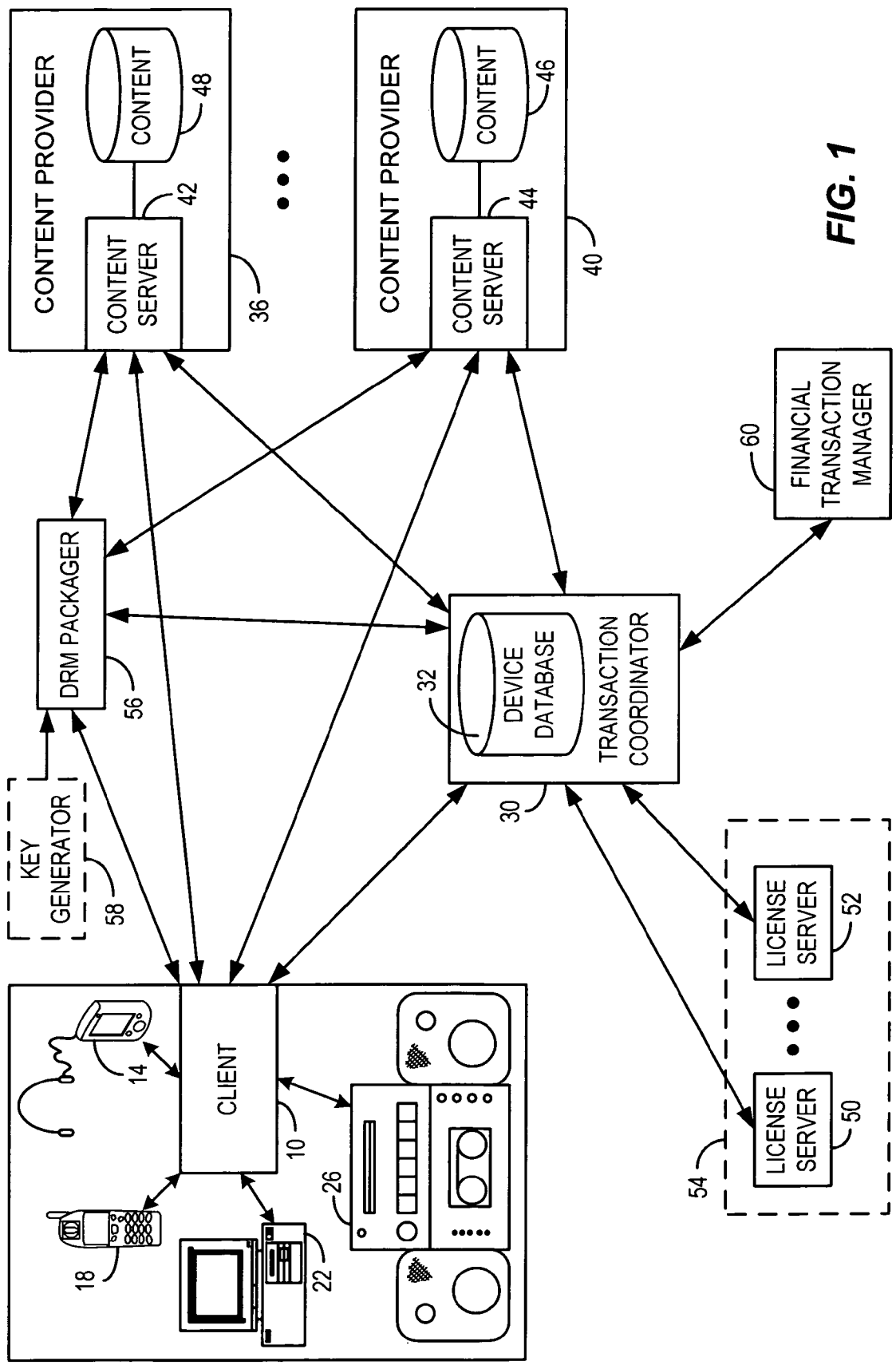
FIG. 1 is a first exemplary system block diagram of a multiple DRM selective encryption system arrangement consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program", "radio program" or other similar content. In this context, the term is used to mean any coherent sequence of audio and/or video content which would be interpreted as and reported in a program guide, listing or catalog as a single program, without regard for whether the content is a movie, sporting event, segment of a multi-part series, news broadcast, etc. This term can also be used to refer to an installment of a "Podcast" or other electronic program material. The term "content" is used as generic to programs, videos, albums, computer programs, electronic games, songs, movies, electronic books and other types of material that is subject to copyright and/or may be protected by a digital rights management (DRM) arrangement.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term digital rights management (DRM) is used herein as in the art to refer to various encryption and conditional access techniques used to establish security for content against piracy of the content while also governing the conditions of use of the content by authorized (e.g., paying) users. Various DRM algorithms and techniques are currently in use in the industry and are generally incompatible with each other. Several examples include, but are not limited to: Marlin DRM (Marlin Joint Development Association), Real Player DRM and Helix DRM (Real Networks, Inc.), Windows Media Player DRM (Microsoft Corp.), Secure Video Processor DRM (NDS), and OMA DRM (Open Mobile Alliance). The term DRM embraces these technologies as well as similar ones that exist or are devised in the future.

Referring now to FIG. 1, a particular individual or family (collectively referred to as client 10) may have a variety of playback mechanisms at his disposal. For example, as depicted in FIG. 1, an exemplary client 10 has at his or her disposal a portable content player 14, a wireless telephone 18, a personal computer 22, and a stereo system 26. Other types of player devices include, but are not limited to, personal digital assistants (PDA), television receivers, digital video recorders (DVR or PVR), among others. For purposes of illustrating the current embodiments of the present invention, assume that each of client 10's available hardware devices are capable of operating on only a single DRM algorithm for playback of DRM protected content (this is not a necessary condition for realizing embodiments consistent with the present invention). If a client wishes to have the capability of playing back content (for example, a downloaded music file, video, radio program or television program), this would be virtually impossible under the current assumptions, that is, a single DRM encoded program that is playable on each of the client's player devices.

Therefore, if client 10 wishes to play the same content on all four devices, under the current assumptions, four separate sets of content generally must be obtained. This is not only costly, but involves four separate downloads and requires approximately four times as much storage space. In some circumstances, the problem can be ameliorated by downloading new DRM algorithms for one or more of the devices so that the content is no longer exclusively usable on a single device (of course, this is contrary to the assumptions for this example). However, even under such circumstance, multiple copies of the content may be required if the user desires to play the content back on any of the available playback devices at his or her disposal.

In accordance with certain embodiments consistent with the present invention, a transaction coordinator 30 (or similar functional entity) used in conjunction with multiple DRM selective encryption as described in the above referenced patented publications provides a mechanism wherein a single unit or assembly of content (for example a song file) can be made usable on any number of the client's playback devices.

In accordance with the current embodiment, client 10 makes contact with transaction coordinator 30 in order to carry out a registration process (e.g., wherein the transaction coordinator 30 operates as a part of a registration services) in which the client's playback devices 14, 18, 22 and 26 are registered with the transaction coordinator 30. Upon registration of the device or devices, the transaction coordinator 30 stores identifying information in a device database 32 relating to client 10, as well as the collection of playback devices available to client 10. Then, either as a result of client 10 supplying information for the database 32 or by the database 32 independently determining the information, the particular DRM algorithm associated with each client device is tabulated and registered in device database 32 (which functions as a registry of the information). In this manner, client 10 can utilize transaction coordinator 30 in a process of acquisition of content such that the content is playable on each of the client's player devices.

In certain instances, for example for devices that are only enabled to utilize a single type of DRM, the transaction coordinator 30 can maintain a library of devices by model, manufacturer, etc. and can relate that model to the single type of DRM that is applicable to the device. In the case of a general purpose device such as a PDA, personal computer or other device that can be enabled by download of a particular DRM and operate under any one of a number of DRMs, transaction coordinator 30 can query the client 10 as to which types of DRM are available. Transaction coordinator may further request the preferred DRM if multiple DRMs are available.

Once a registration process is completed, client 10 may wish to place an order for a particular piece of content, such as a song or a movie. In so doing, transaction coordinator 30 either directly or indirectly coordinates the transaction in a manner that permits the content to be acquired in a form that is playable on all of the client's playback devices which are compatible with the type of content (i.e., video, audio, games, software, electronic book, movies, etc.). In some instances, content may only be playable on a single device (e.g., a proprietary game player), but in others, the content may be playable on two or more devices. While the transaction coordinator 30 can facilitate download of content for a single device, the more interesting aspect of certain embodiments occurs when multiple devices having differing DRM capability are being serviced.

An order is placed either to a content provider such as 36 or 40. At each of a plurality of content providers, a content server such as 42 or 44 is provided which can access content from content databases such as 46 and 48. When content is ordered by client 10, the transaction coordinator 30 looks up client 10 in its device database 32 to determine what DRM algorithms are needed to provide the client 10 with content that is playable on a selection of multiple devices. Once transaction coordinator 30 determines which DRM algorithms are needed, the transaction coordinator 30 can directly or indirectly obtain licenses from one or more license servers such as 50 and 52 (collectively 54) and convey information associated with the acquired licenses to a DRM packager 56. The DRM packager 56 obtains content from content server 42 or 44, for example, and then formats the retrieved content. In a first exemplary embodiment consistent with the present invention the content is formatted as multiple DRM selectively encrypted content. With this embodiment, the DRM systems do not need to share content encryption keys or content encryption algorithms. Content encryption is independently handled by each DRM system. In a second embodiment consistent with the invention, the content is encrypted with a common content key, which is obtained from a Key Generator 58 which is shared between the DRM systems. In that alternative embodiment, the content encryption method must be common.

The DRM packager 56 packages the content for the client 10 by use of the license information obtained from the license servers 54 to determine how (i.e., using what encryption algorithm) to encrypt the content, and what digital rights to embed in the DRM encoding. The DRM packager then either, in the first exemplary embodiment, multiple DRM selectively encrypts the content for delivery to the client 10, or in the second exemplary embodiment of the invention, encrypts the content (using a shared content key generated by key generator 58) for delivery to the client 10. This encrypted content is then transferred to the client 10 (either directly from the DRM packager, via one of the content providers or via transaction coordinator 30 or other intermediary). The client 10 is able to recover the appropriate content key from the licenses and then able to play the content on any appropriate playback device compatible with any of the DRM algorithms.

Multiple selective DRM encryption, used by one of the embodiments of the invention, is described in substantial detail in the above referenced patent applications, taken together with their parent or referenced patent applications. The process as it relates to the present process will be described in greater detail later.

In order for the playback devices to be able to play back the encrypted content, DRM packager 56 also transmits to the client 10 a key package. Such key package incorporates the decryption keys needed to decrypt the DRM encrypted content, and may also include digital rights limitations on the use of the content. Even if the content keys are shared, the content keys are encrypted or encoded by each DRM system. Thus, with both embodiments of the invention, using selective multiple DRM encryption and key sharing approaches, if three DRMs are utilized with multiple DRM selective encryption, at least three encrypted or encoded keys are sent to the client for use in either decrypting the content or decrypting a key used to decrypt the content. For purposes of this document, both possibilities and combinations thereof are to be considered equivalent.

In addition to the above, it is noted that most such downloaded transactions for playable content are carried out using the Internet. Moreover, a financial transaction manager 60 is generally involved in the process. Transaction coordinator 30 can either coordinate the financial transaction with financial transaction manager 60 or act as an intermediary for the financial transaction manager 60 by actually collecting funds from the client and forwarding the funds or an appropriate portion thereof to the financial transaction recipient for use of the content. Such financial transaction may be carried out as an integral part of the present process and may be intimately involved with obtaining licenses for the content under the various DRM algorithms.

In FIG. 1, many of the elements utilized to accomplish the transaction and delivery of content as described above are depicted as being carried out at separate entities (DRM packager, content provider, license server, etc.). However, this need not be the case. Any or all of the entities beyond the client can be merged into a single entity or multiple entities that can efficiently carry out the process described. For example, the transaction coordinator can also be integrated with a plurality of license servers, and the DRM packager 56 may form a part of the same entity or may be part of a content provider. Numerous other arrangements are possible. FIG. 1 takes one extreme or near extreme view of the arrangement of the various entities associated with this transaction. In FIG. 1, each entity is depicted as a separate entity for purposes of carrying out the transaction.

Figure 2:
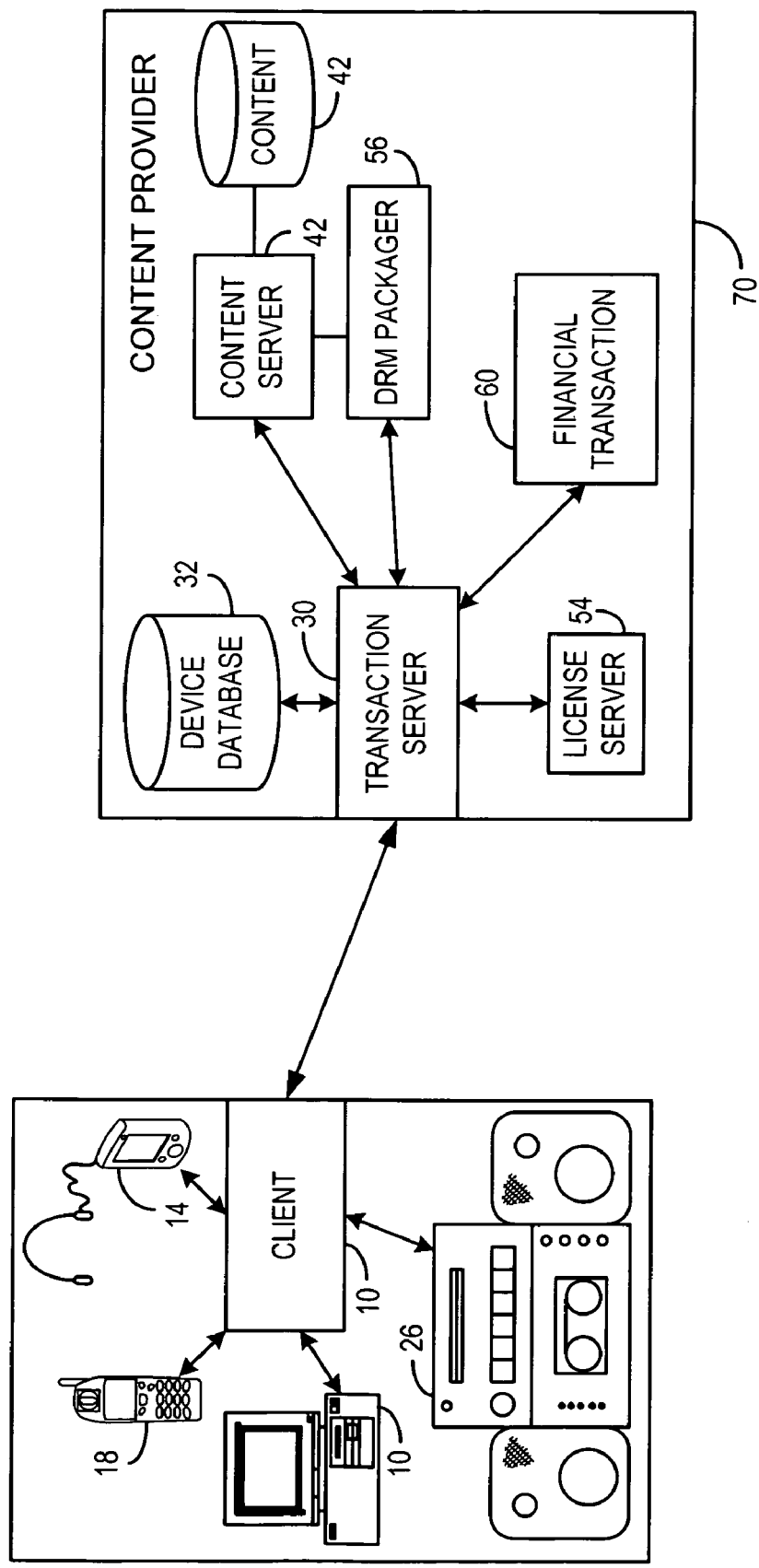
FIG. 2 is a second exemplary system block diagram of a multiple DRM selective encryption system arrangement consistent with certain embodiments of the present invention.

Referring now to FIG. 2, another extreme of the possibility for arrangement of the various entities is depicted. In this depiction, content provider 70 is configured to carry out all of the functions described by the individual entities as previously described. In this embodiment, the transaction server 30 carries on all direct communication with client 10. The device database 32 and license server 54, as well as the financial transaction entity, are all packaged together as a seamless unit for supplying the DRM encrypted content to the client 10. Content provider 70 further warehouses and supplies the electronic content in database 48 and maintains device database 32 which tracks the client's hardware and software capabilities.

Figure 3:
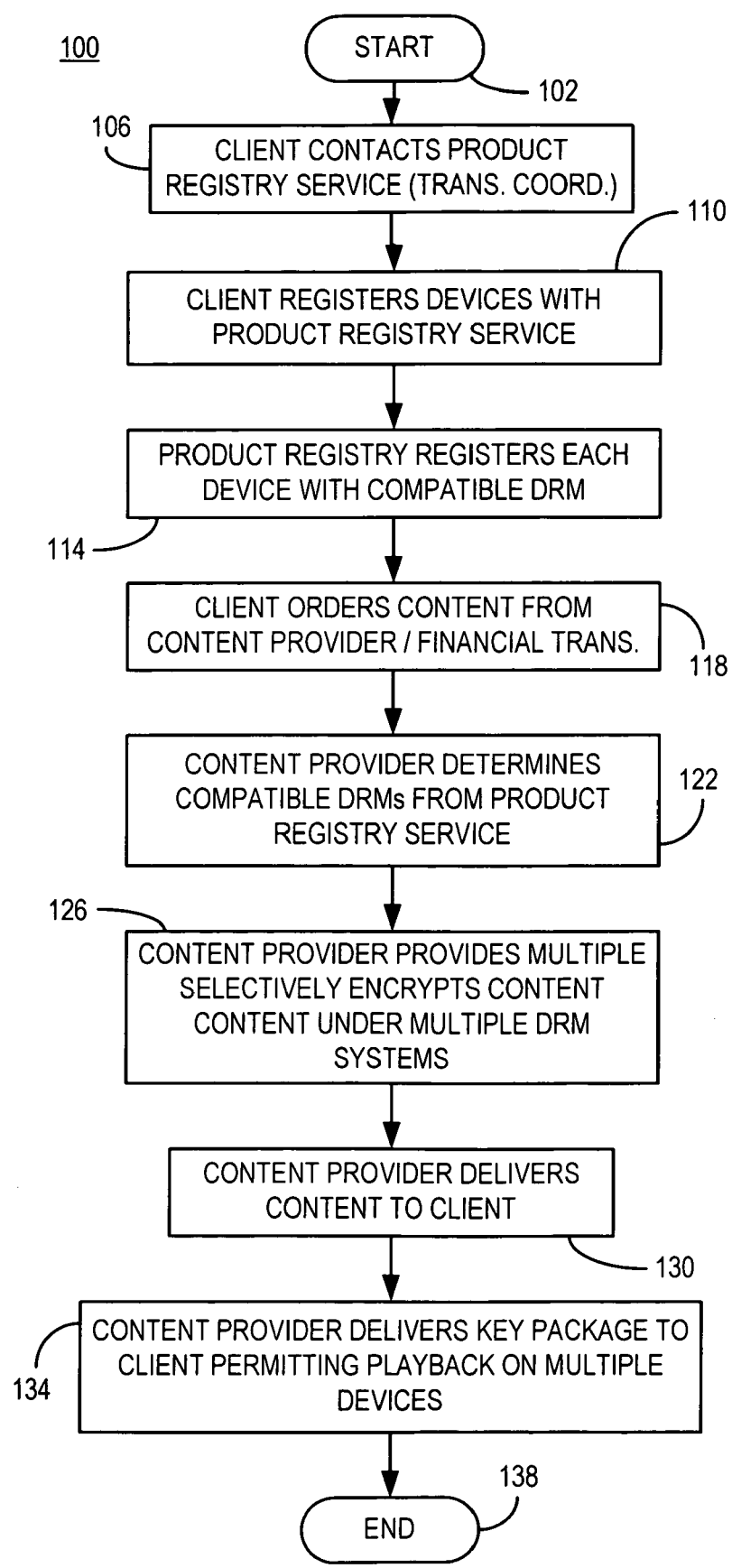
FIG. 3 is a flow chart depicting one embodiment of a method consistent with certain embodiments of the present invention.

Referring now to FIG. 3, a process 100 starting at 102 is presented which generally describes an exemplary overall process utilized in conjunction with embodiments consistent with the present invention. It should be noted, however, that many variations in this process are possible, including the ordering of the steps in the process. At 106, the client 10 contacts the product registry service or transaction manager 30 in order to register the hardware and DRM capabilities available to the client. At 110, the client 10 registers the devices with the product registry service (e.g., a transaction coordinator) so that later orders can be facilitated. At 114, the product registry registers each device of the client and associates it with a compatible DRM. The compatible DRM may be either obtained by virtue by a lookup table or database used by the transaction manager 30 or may be independently supplied by the client 10. At this point, the registration process is complete for registering the client's hardware and software.

At 118, the client may place an order for content from the content provider and carry out an associated financial transaction. The content provider then determines compatible DRM from the product registry service at 122. The client, at this point or some other convenient point in the process, may be asked to select any or all of the available content player devices for the selected content. The content provider at 126 provides encrypted content for the multiple DRM systems determined from the product registry database at 126. At 130, the content provider delivers content to the client 10. At 134, the content provider delivers a key package to the client that permits playback on multiple devices. The process then ends at 138.

As previously noted, there are many configurations of transaction manager 30, content provider, and DRM packaging, etc. that are possible within the bounds of embodiments consistent with the present invention. Therefore, references in FIG. 3 to a particular entity are intended to be illustrative only and not limiting. For example, block 126 indicates that the content provider provides the multiple DRM selective encryption in the first embodiment of the invention. However, a separate DRM packager 56 may be utilized to do the multiple DRM selective encryption. Similarly, delivery of keys, as in block 134, may be carried out directly from the content provider, through a transaction coordinator, or through a DRM packager. No limitations on the source or arrangement of the services described should be implied from the particular illustrative embodiments set forth herein.

Figure 4:
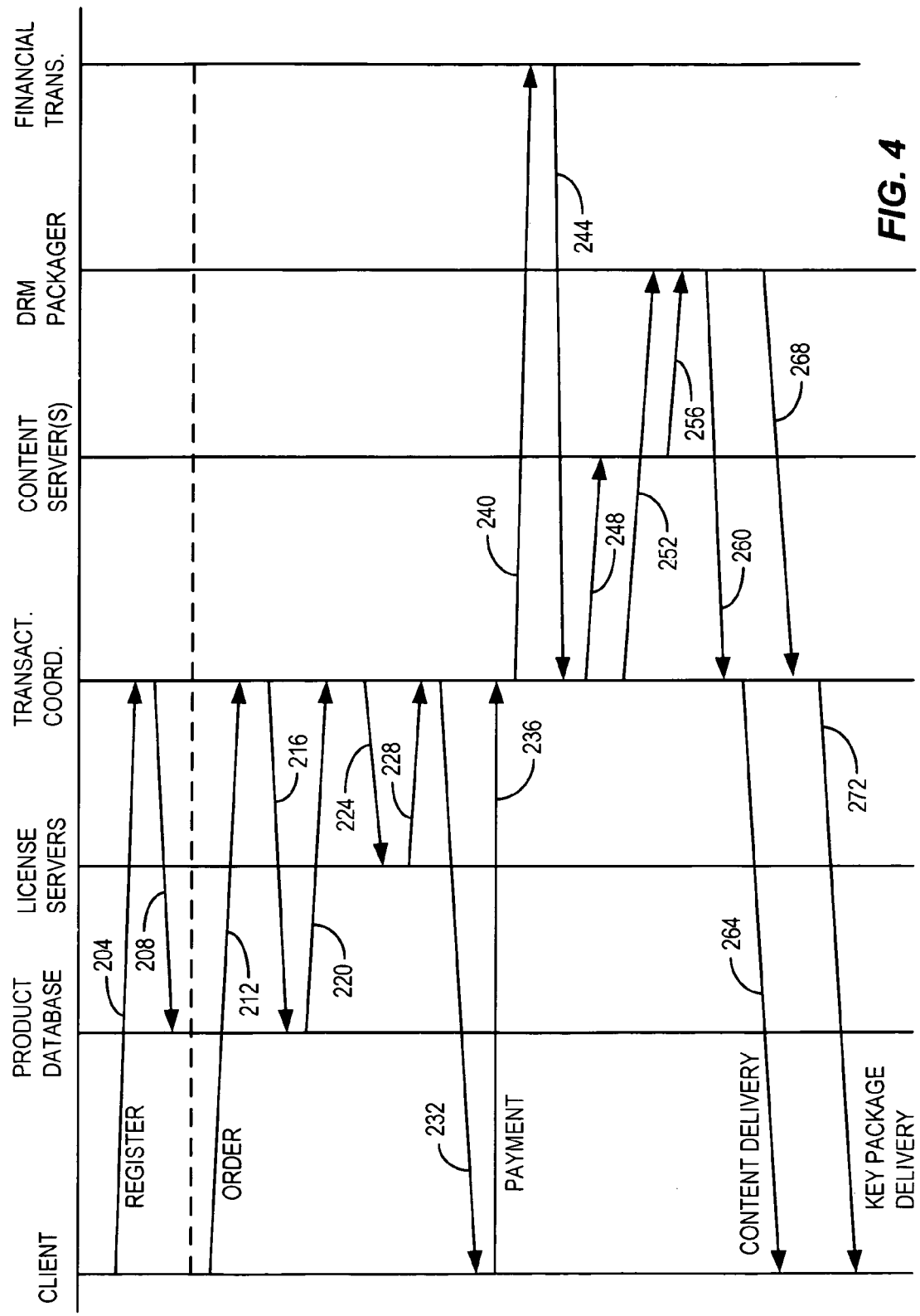
FIG. 4 is an exemplary signal flow diagram depicting one embodiment consistent with the present invention.

To further illustrate the diversity of arrangements that can be utilized to provide the services described herein, FIG. 4 provides a signal flow diagram that illustrates the registration and product delivery processes. In this embodiment, at 204, the client 10 sends registration information to a transaction coordinator 30. Transaction coordinator 30 then registers the data submitted by the client in a product database 32 at 208 to complete the registration process. Upon entry into the product database, the database is provided with hardware and software available to the client, as well as applicable DRM algorithms associated with each playback device.

When an order is to be placed, the client 10 again contacts the transaction coordinator 30 at 212 to place the order. At 216, the transaction coordinator 30 refers to the product database 32 to determine which DRM algorithms are applicable to the current order. At 220, the transaction coordinator 30 receives the DRM information requested. At 224, the transaction coordinator 30 coordinates with license servers 54 (or other licensing entities) to request the DRM information and licenses necessary to complete the order. Such information is then communicated back to the transaction coordinator at 228. It is envisioned that the licensing charges for a particular item of content may vary depending on how many and which licenses are necessary. Therefore, at 232, the transaction coordinator 30 may convey a price for the licenses to the client 10. (At this point, for example, the client may wish to specify which devices the content should to be encoded for playback, or which DRMs should be used.) The client may then, at 236, provide payment to the transaction coordinator 30. The transaction coordinator 30 may then forward all or a portion of the payment to the entity or entities that are to be compensated in the financial transaction at 240.

Upon confirmation of receipt of the payment at 244, the transaction coordinator requests content from the content server at 248. The transaction coordinator 30 further requests DRM packaging from the DRM packager 56 at 252, and the content server delivers the content to the DRM packager 56 at 256. At 260, the DRM packager 56 delivers the content to the transaction coordinator who at 264 forwards the content to the client 10. At this point, the client 10 possesses the content, but is still unable to utilize it until the DRM packager 56 sends the key package to transaction coordinator 30 at 268, and the transaction coordinator 30 delivers the key package to the client at 272. At this point, in the first embodiment, the assembled content includes unencrypted content, as well as content that is multiple DRM encrypted under multiple DRM algorithms for each of a plurality of segments of selected portions of the content. In the second embodiment, the content may be fully encrypted (using a shared content key). Thus, a single unified file or other unit of content can be utilized at the client 10 on any of a plurality of devices having incompatible DRM algorithms as their capability.

Figure 5:
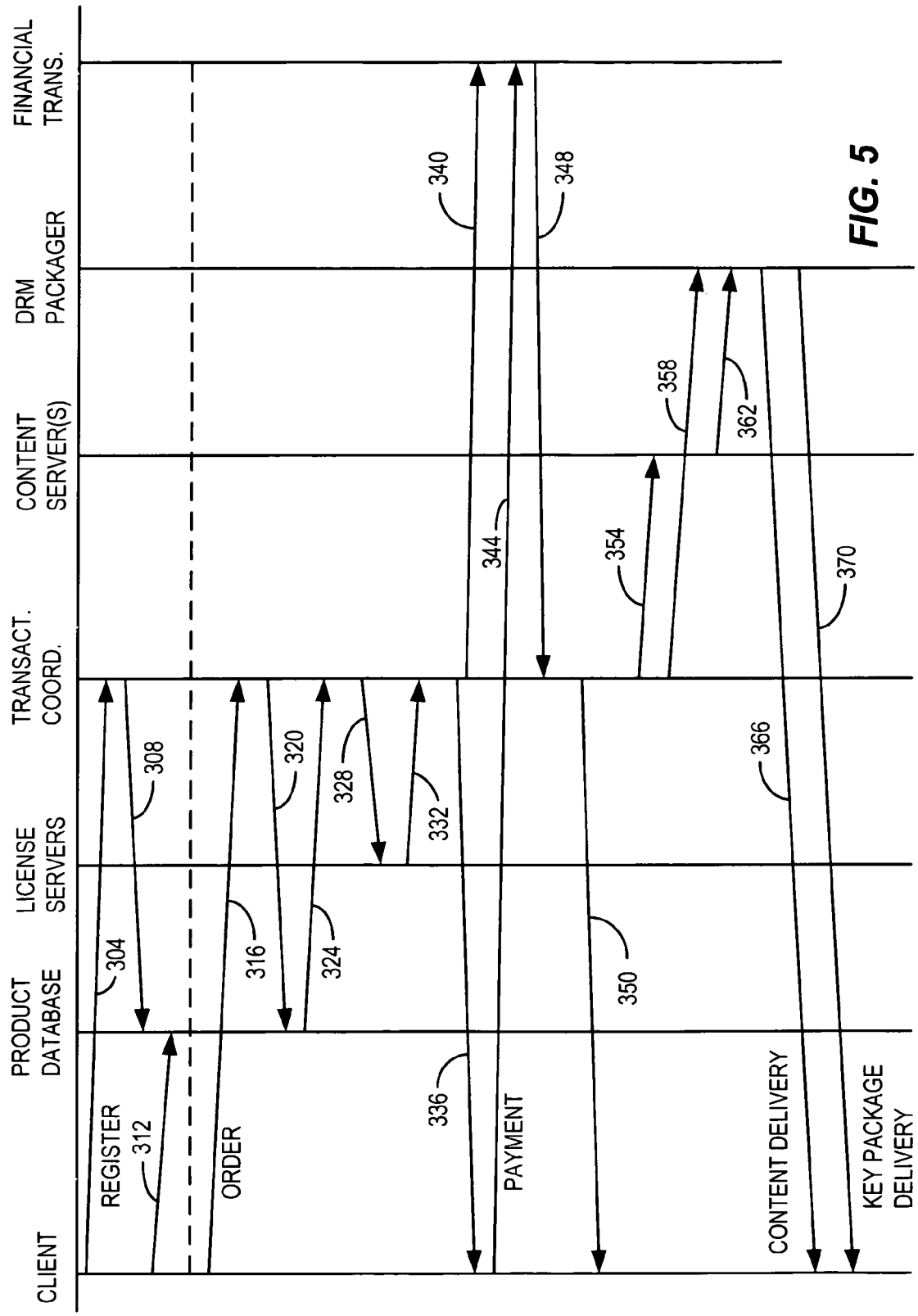
FIG. 5 is another exemplary signal flow diagram depicting one embodiment consistent with the present invention.

By way of illustrating an alternative, FIG. 5 depicts an arrangement wherein the transaction coordinator 30 is utilized in a slightly different manner and many of the transactions carried on by the client 10 are carried out more directly with the other entities as depicted in FIG. 1. In this embodiment, again a registration process is utilized starting at 304 where the client 10 contacts a transaction coordinator 30 to arrange registration in a product database 32 of his or her various playback devices (hardware and software). The transaction coordinator 30 at 308 informs the product database 32 of the desire for registration by the client 10, and the client 10 at 312 directly interacts with an entity that maintains the product database 32. At this point, the registration process is complete.

In order to place an order, the client 10 again contacts the transaction coordinator 30 at 316 (or in another embodiment contacts product database directly), and the transaction coordinator 30 obtains the DRM information at 320 from the product database 32. The product database 32 replies at 324 with the appropriate DRM data. Transaction coordinator 30 then solicits appropriate licenses at 328 from license servers 54, and at 322 receives the license information necessary to complete the transaction. At 336, the transaction coordinator 30 informs the client 10 that the appropriate licenses have been obtained and makes arrangements for a financial transaction at 340. At 344, the client 10 interacts directly with the financial transaction manager 60 to make payment for the content which has been ordered. Upon completion of this financial transaction, the financial transaction manager 60 coordinates with the transaction coordinator 30 at 348 to advise the transaction coordinator 30 that payment has been received. This is confirmed at 352 with the transaction coordinator 30 informing the client 10 that the transaction is complete and download is about to begin. At 354, the transaction coordinator 30 notifies the content server that the financial transaction has been completed and forwards appropriate licensing information to the content server.

At 358, the transaction coordinator 30 similarly informs the DRM packager 56 of the completion of the transaction and provides the DRM packager with appropriate data for the final packaging of the content in multiple DRM selectively encrypted form. At 362, the content server delivers the content to the DRM packager 56, and the DRM packager 56 packages the content with the appropriate multiple DRM selective encryption at 366 and forwards the content to the client 10. At 370, the DRM packager forwards the key package to the client. At this point, the client has everything needed to decrypt and utilize the content. As previously noted, key package delivery can entail delivery of keys to content, or a keys or keys to a key to content (or some combination thereof) using any suitable mechanism.

Figure 6:
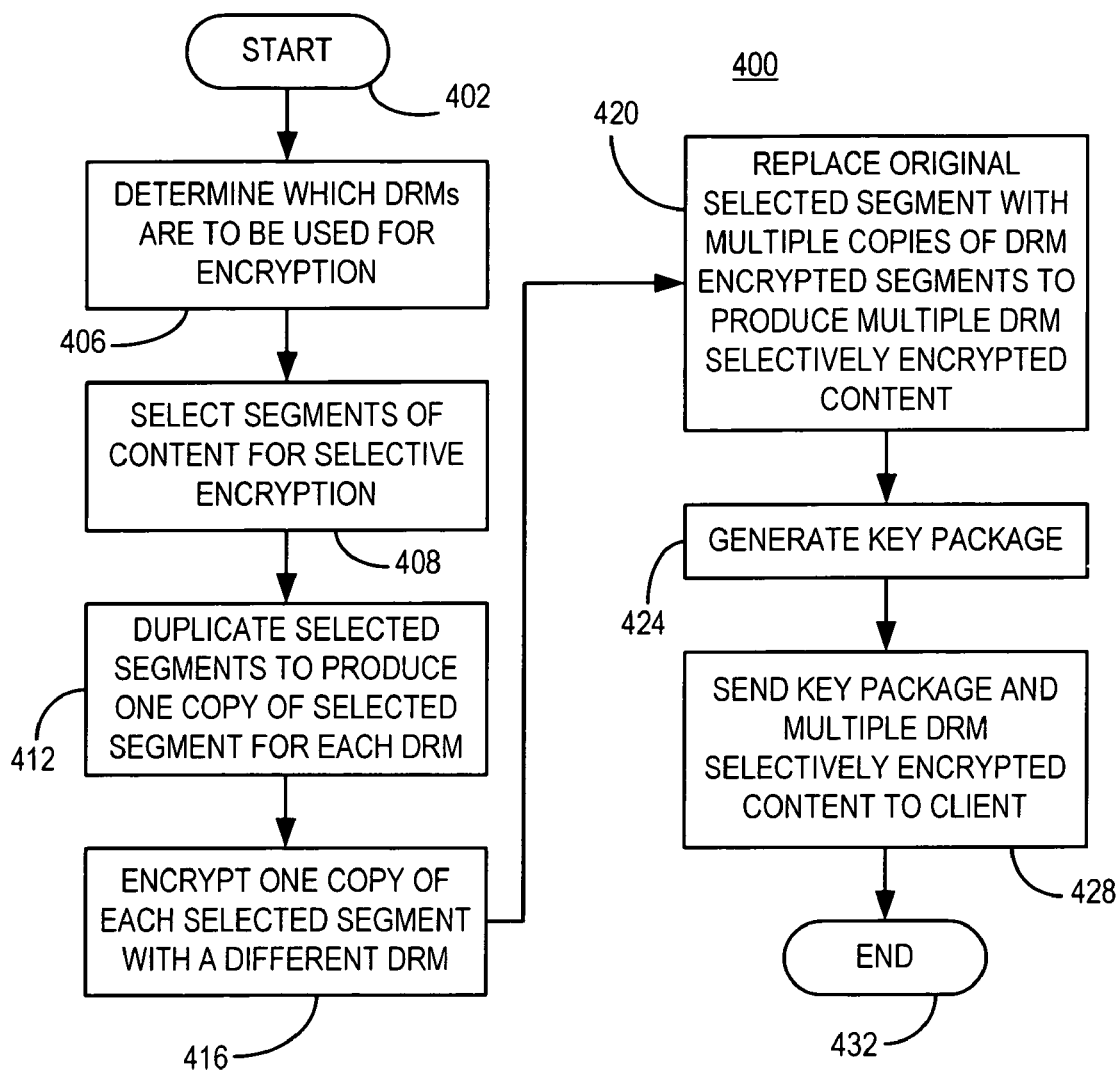
FIG. 6 is a flow chart of a process consistent with certain embodiments of the present invention.

Referring now to FIG. 6, by way of a brief explanation for the first embodiment of the invention, a selective encryption technique as utilized herein to protect content from unauthorized copying is explained starting at 400. At 406, the transaction coordinator 30 or equivalent entity determines which DRMs are to be used for the multiple DRM selective encryption. At 408, as a part of the encryption technique, certain packets or other data units of the content are selected according to a selection criterion. This selection criterion can be any of a number of a selection criteria, but suffice it to say that if the segments of content that are selected by the selection criterion are encrypted, then the content itself will be unusable or seriously handicapped in use by anyone attempting to use the content in an unauthorized manner.

Once the segments of content are selected for encryption, those segments of content are duplicated at 412 to produce one copy for each DRM algorithm that is to be incorporated in the final assembly of content. Thus, if three DRM algorithms are to be utilized, a total of three identical copies of the selected content are encrypted using one DRM algorithm for each copy. The duplicated selected content is then encrypted with each copy being encrypted using a different DRM at 416. The content is then reassembled with the originally selected portions removed and replaced by multiple copies of DRM encrypted selected segments at 420. In this manner, portions of the content are multiply encrypted under three, in this case, different DRM algorithms. Where a single segment of content resides in the original content, three differently encrypted segments of content are inserted. A key package is then generated at 424 and the key package and multiple DRM selectively encrypted content is sent to the client at 428. The process then ends at 432.

Figure 7:
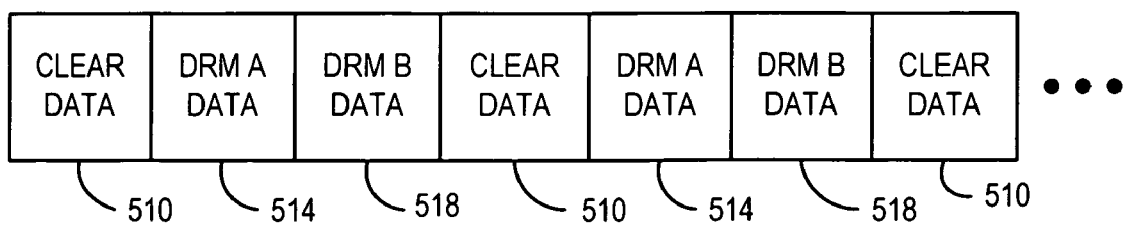
FIG. 7 is a diagram illustrating a multiple DRM encrypted data stream process consistent with certain embodiments of the present invention.

This process results in a content stream that resembles that of FIG. 7. In this example, two DRMs are utilized and the resulting stream includes segments of clear content 510 followed by content encrypted under a first DRM (DRM A) and then content encrypted under a second DRM (DRM B). Using this technique, most playback devices will simply ignore packets or other segments of content that it cannot properly decode, and decode those segments that can be decoded or decrypted under a particular DRM algorithm. Thus, any of the available playback devices of client 10 can be utilized for playback of content.

It is noted that a content player may be a programmable device such as a programmable personal computer that is capable of operation under any one of a plurality of programmed DRM algorithms. As such, a single content player that operates under multiple DRM algorithms can be considered to be the equivalent of multiple content players. Delivery of the content can equivalently be accomplished via download, streaming or delivery of packaged media.

Thus, in one embodiment, a method for enabling a single assembly of content to be played on a plurality of player devices, each having at least one available digital rights management (DRM) algorithm, wherein the DRM algorithms for the player devices need not necessarily be the same involves registering a plurality of player devices associated with a client with a database registry, wherein each of the plurality of player devices is enabled to play content using at least one (DRM) algorithm when an appropriate license has been secured; upon registering the plurality of player devices, registering the one or more associated DRM algorithms with each player device; upon receipt of a request for delivery of specified content to the client, searching the database registry for a list of compatible devices and compatible DRM algorithms for the content; obtaining a plurality of licenses to the content, at least one for each DRM algorithm for the player devices associated with the client; obtaining the content from a content provider; and encrypting the content under each of the DRM algorithms to produce multiple DRM selectively encrypted content, wherein the multiple DRM selectively encrypted content comprises: segments of the specified content that are unencrypted, and selected segments of the content which are duplicated to produce one copy of the selected content for each of the DRM algorithms with each duplicate copy of the selected segments encrypted under a different one of the DRM algorithms, and wherein, the unencrypted segments of content are assembled together with each of the DRM encrypted duplicate selected segments to produce a single unified content assembly that can be played on any of the player devices.

In certain embodiments, the method further involves delivering the multiple DRM selective encrypted content to the client. In certain embodiments, the method further involves the delivering of the content by at least one of download, streaming or delivery of packaged media. In certain embodiments, the plurality of licenses is obtained from at least one licensing server. In certain embodiments, the content is multiple DRM selective encrypted at a DRM packager. In certain embodiments, the DRM packager delivers the multiple DRM selective encrypted content directly to the client. In certain embodiments, the DRM packager delivers the multiple DRM selective encrypted content to the client via a transaction manager. A computer readable storage medium can store instructions which, when executed on a programmed processor, carry out any of these processes.

Another method consistent with certain embodiments for enabling a single assembly of content to be played on a plurality of player devices, each having at least one available digital rights management (DRM) algorithm, wherein the DRM algorithms for the player devices need not necessarily be the same, involves registering a plurality of player devices associated with a client with a database registry, wherein each of the plurality of player devices is enabled to play content using at least one (DRM) algorithm when an appropriate license has been secured; upon registering the plurality of player devices, registering the one or more associated DRM algorithms with each player device; upon receipt of a request for delivery of specified content to the client; searching the database registry for a list of compatible devices and compatible DRM algorithms for the content; obtaining a plurality of licenses to the content from at least one license server, at least one for each DRM algorithm for the player devices associated with the client; obtaining the content from a content provider; and at a DRM packager, encrypting the content under each of the DRM algorithms to produce multiple DRM selectively encrypted content, wherein the multiple DRM selectively encrypted content comprises: segments of the specified content that are unencrypted, and selected segments of the content which are duplicated to produce one copy of the selected content for each of the DRM algorithms with each duplicate copy of the selected segments encrypted under a different one of the DRM algorithms, and wherein, the unencrypted segments of content are assembled together with each of the DRM encrypted duplicate selected segments to produce a single unified content assembly that can be played on any of the player devices; the DRM packager electronically delivering the multiple DRM selective encrypted content directly to the client by either download or streaming.

A system, consistent with certain embodiments, for enabling a single assembly of content to be played on a plurality of player devices, each having at least one available digital rights management (DRM) algorithm has a database that registers a plurality of player devices associated with a client with a database registry, wherein each of the plurality of player devices is enabled to play content using at least one (DRM) algorithm when an appropriate license has been secured. The database further registers one or more associated DRM algorithms with each player device. A transaction coordinator, upon receipt of a request for delivery of specified content to the client, obtains from the database a list of compatible devices and compatible DRM algorithms for the ordered content. The transaction coordinator further obtains a plurality of licenses to the content, at least one for each DRM algorithm for the player devices associated with the client. A content provider that provides the content, and a DRM packager that encrypts the content under each of the DRM algorithms to produce multiple DRM selectively encrypted content, wherein the multiple DRM selectively encrypted content comprises: segments of the specified content that are unencrypted, and selected segments of the content which are duplicated to produce one copy of the selected content for each of the DRM algorithms with each duplicate copy of the selected segments encrypted under a different one of the DRM algorithms, and wherein, the unencrypted segments of content are assembled together with each of the DRM encrypted duplicate selected segments to produce a single unified content assembly that can be played on any of the player devices.

In certain embodiments, the system further has at least one licensing server that provides a plurality of licenses to the content to the transaction coordinator. In certain embodiments, the system further has means for delivering the multiple DRM selective encrypted content to the client. In certain embodiments, the delivering of the content is by at least one of download, streaming or delivery of packaged media. In certain embodiments, the DRM packager delivers the multiple DRM selective encrypted content directly to the client. In certain embodiments, the DRM packager delivers the multiple DRM selective encrypted content to the client via the transaction manager. In certain embodiments, the database operates under control of the transaction manager. In certain embodiments, any or all of the transaction manager, DRM packager and license server operate under control of the content provider. In certain embodiments, the DRM packager operates under control of the content provider.

In another embodiment, a system for enabling a single assembly of content to be played on a plurality of player devices, each having at least one available digital rights management (DRM) algorithm has a database that registers a plurality of player devices associated with a client with a database registry, wherein each of the plurality of player devices is enabled to play content using at least one (DRM) algorithm when an appropriate license has been secured. The database further registers one or more associated DRM algorithms with each player device. A transaction coordinator, upon receipt of a request for delivery of specified content to the client, obtains from the database a list of compatible devices and compatible DRM algorithms for the ordered content. The transaction coordinator further obtains a plurality of licenses to the content, at least one for each DRM algorithm for the player devices associated with the client. A content provider provides the content and a DRM packager encrypts the content under each of the DRM algorithms to produce multiple DRM selectively encrypted content, wherein the multiple DRM selectively encrypted content comprises: segments of the specified content that are unencrypted, and selected segments of the content which are duplicated to produce one copy of the selected content for each of the DRM algorithms with each duplicate copy of the selected segments encrypted under a different one of the DRM algorithms, and wherein, the unencrypted segments of content are assembled together with each of the DRM encrypted duplicate selected segments to produce a single unified content assembly that can be played on any of the player devices. At least one licensing server provides a plurality of licenses to the content to the transaction coordinator. The multiple DRM selective encrypted content is delivered to the client by at least one of download, streaming or delivery of packaged media.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Figure 8:
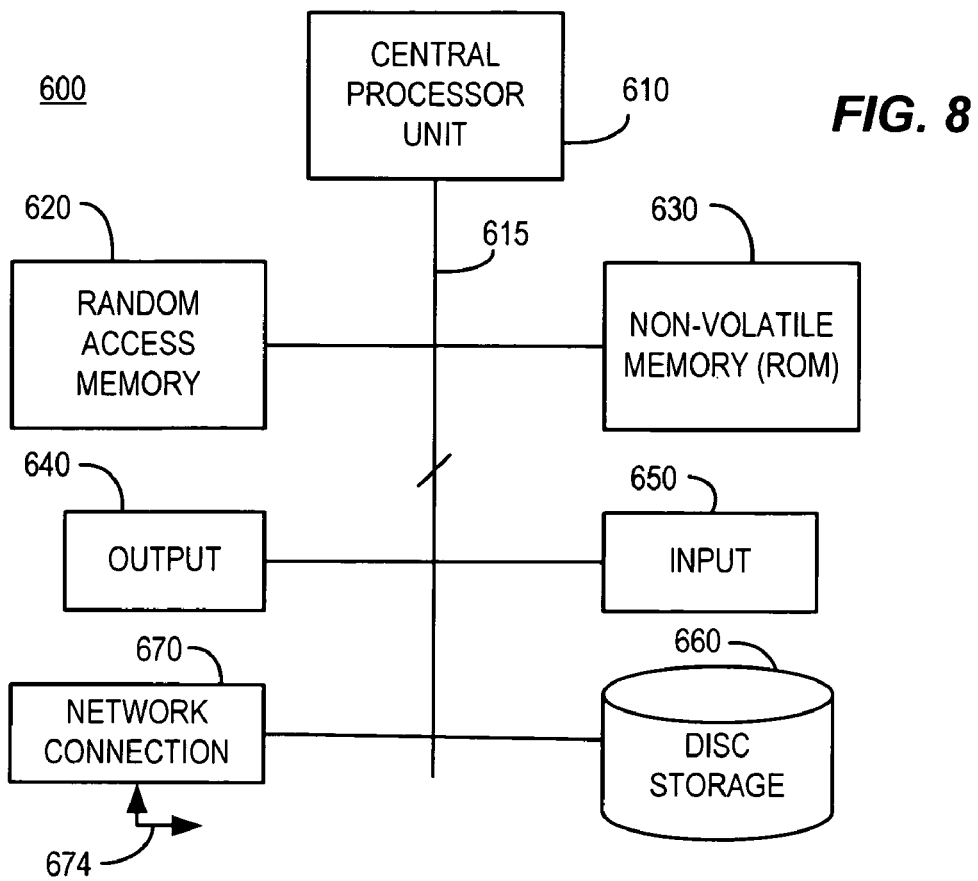
FIG. 8 is a block diagram of a computer system suitable for use in realizing certain of the blocks of FIG. 1 in a manner consistent with certain embodiments of the present invention.

The processes previously described in connection with any of the transaction coordinator 30, device database 32, DRM packager 56, financial transaction manager 60 and license server 54 can be carried out on a programmed general purpose computer system, such as the exemplary computer system 600 depicted in FIG. 8. Computer system 600 has a central processor unit (CPU) 610 with an associated bus 615 used to connect the central processor unit 610 to Random Access Memory 620 and/or Non-Volatile Memory 630 in a known manner. An output mechanism at 640 may be provided in order to display and/or print output for the computer user. Similarly, input devices such as keyboard and mouse 650 may be provided for the input of information by the computer user. Computer 600 also may have disc storage 660 for storing large amounts of information including, but not limited to, program files and data files. Computer system 600 may be is coupled to a local area network (LAN) and/or wide area network (WAN) and/or the Internet using a network connection 670 such as an Ethernet adapter coupling computer system 600, possibly through a fire wall. The exact arrangement of the components of FIG. 8 will depend upon the function carried out in the particular one of the devices implemented. Additionally, the network connection 670 and network interface may depend upon whether the associated components are situated locally or remotely, with data passing to and from the processor system 600 via line 674.

Figure 9:
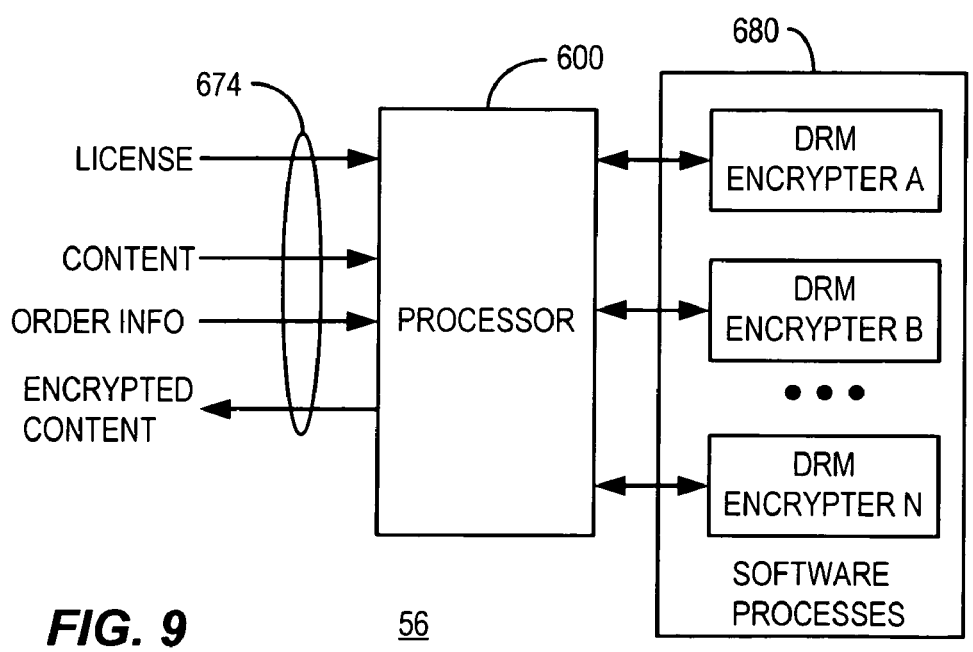
FIG. 9 is a block diagram of a DRM packager consistent with certain embodiments of the present invention.

By way of example, FIG. 9 depicts a functional block diagram of one embodiment of a DRM packager 56 implemented in a processor system 600. In this embodiment, license information, order information and content are received at 674 and the finally encrypted content is transmitted out at 674. Processor 600 operates using software encryption processes 680 to carry out the DRM encryption as required.

Figure 10:
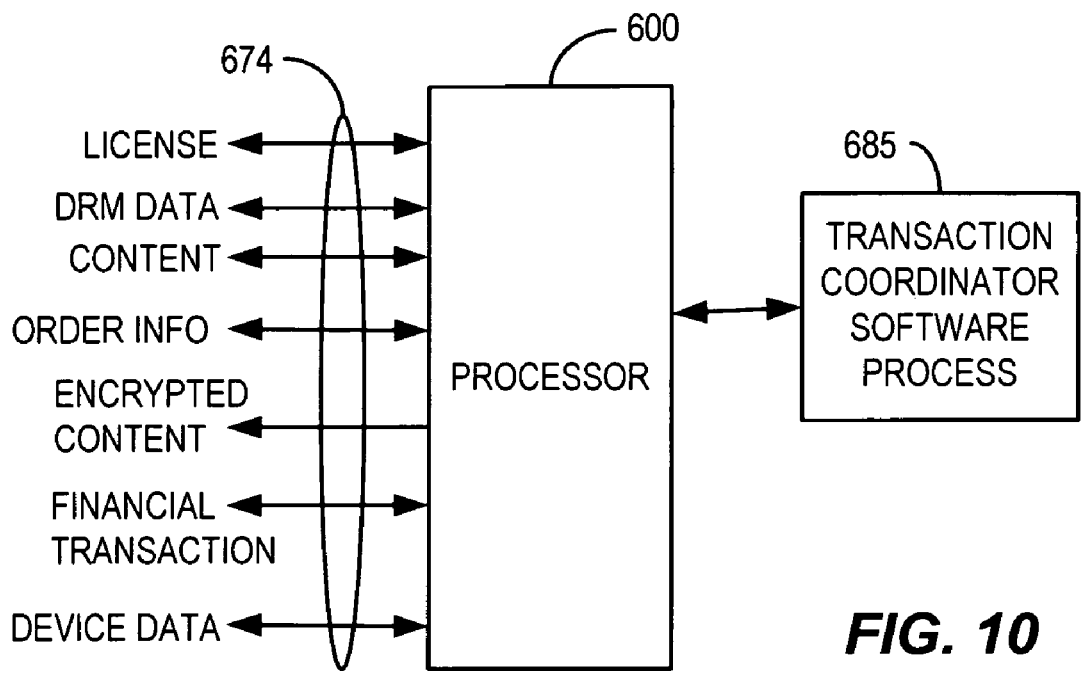
FIG. 10 is a block diagram of a transaction coordinator consistent with certain embodiments of the present invention.

FIG. 10 similarly illustrates one configuration and operation of a transaction coordinator 30 implemented using a processor system such as 600. In this embodiment, network interface 670 communicates via network medium 674 to receive license data from the license servers 54 and sends requests thereto. This interface also receives DRM data from the license server or transaction manager and content from the content provider. Order information, and financial transaction confirmations may also be received along with device/DRM data from the device database 32 when requested. The encrypted content is delivered via this interface. This operation is carried out under control of processor 600 running transaction coordinator software 685.

Figure 11:
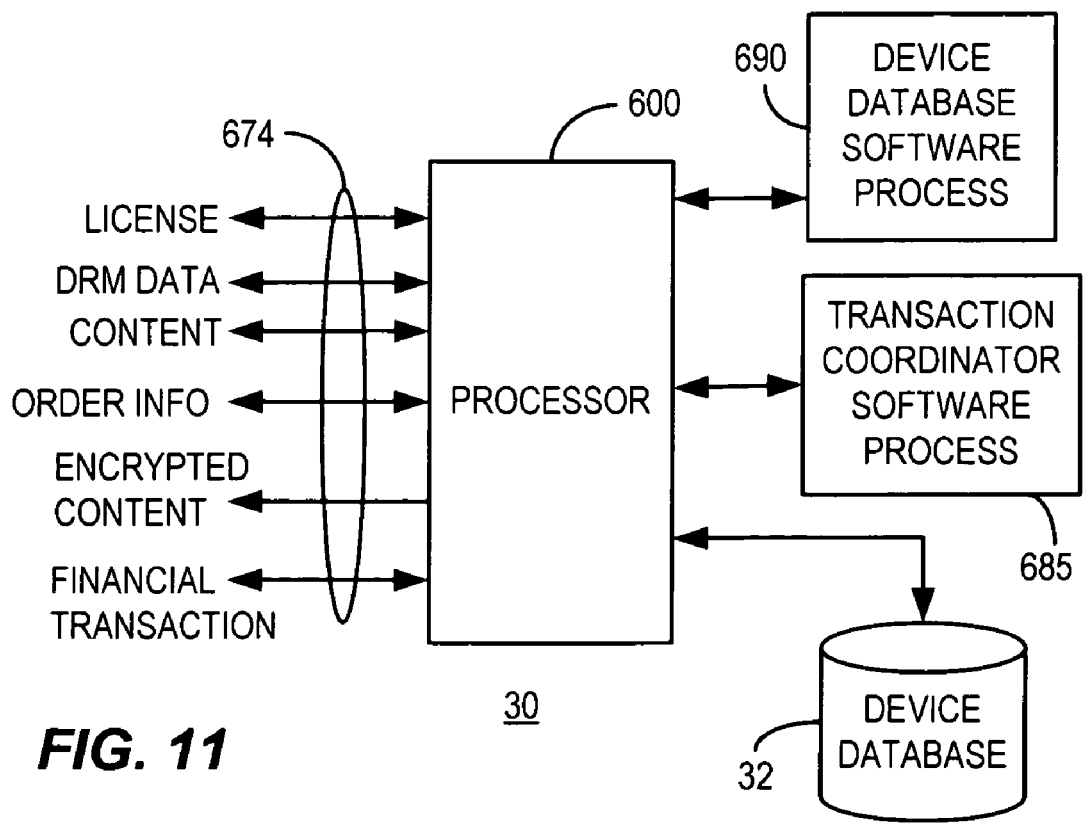
FIG. 11 is a block diagram of a transaction coordinator with integral device database consistent with certain embodiments of the present invention.

FIG. 11 similarly illustrates one configuration and operation of a transaction coordinator 30 implemented using a processor system such as 600 which additionally functions as the device database. In this embodiment, functions as described in connection with FIG. 10 are similarly carried out except that device data correlating devices to DRM algorithms are stored locally in device database 32 and processor 600 also functions as the database manager by running device database software 690.

Other arrangements can also be used by those skilled in the art upon consideration of the present teachings. For example, license servers 54 and financial transaction manager 60 may be similarly configured using general purpose processing components and may be integrated with certain of the other components.

Thus, a transaction manager consistent with certain embodiments has means for storing information in a database that registers a plurality of player devices associated with a client in a database, wherein each of the plurality of player devices is enabled to play content using at least one (DRM) algorithm when an appropriate license has been secured. One or more associated DRM algorithms with each said player device is stored in the database. The database software determines one or more compatible DRM algorithm associated with the client's player device from the database, upon receipt of a request for delivery of content to the client.

In certain embodiments, the transaction manager further has a mechanism for obtaining a plurality of licenses to the content, at least one for each DRM algorithm for a plurality of player devices associated with the client. In certain embodiments, the transaction manager may further arrange delivery of the content requested for delivery by the user from a content provider. In certain embodiments, the transaction manager arranges encryption by a DRM packager that encrypts the content under each of the DRM algorithms to produce encrypted content. The encrypted content may be multiple DRM selected encryption. The database may operate under control of the transaction manager. Any or all of the transaction manager, DRM packager and license server may operate under control of the content provider.

Furthermore, a DRM registry consistent with certain embodiments receives information relating a plurality of player devices associated with a client and storing the information in a database. The DRM registry software determines which of one or more DRM algorithms can be used with each of the player devices and storing the information in the database. The DRM registry retrieves one or more DRM algorithms associated with one or more player devices upon receipt of an inquiry. In certain embodiments, the DRM registry further has a transaction coordinator that, upon receipt of a request for delivery of specified content to the client, issues a query to the database to obtain from the database a list of compatible devices and compatible DRM algorithms for the ordered content.

A DRM packager consistent with certain embodiments has a processor that receives licensing information including a plurality of encryption keys for a corresponding plurality of DRM encryption algorithms. The DRM packager receives content from a content provider. An encrypter encrypts the content under each of the plurality of DRM algorithms to produce multiple DRM selectively encrypted content, wherein the multiple DRM selectively encrypted content as previously described. In certain embodiments, at least one licensing server provides the license information to the DRM packager. In certain embodiments the DRM packager further has means for delivering the multiple DRM selective encrypted content to a client by at least one of download, streaming or delivery of packaged media, and means for delivering a key package to the client. The DRM packager may deliver the multiple DRM selective encrypted content directly to a client, or, the DRM packager may deliver the multiple DRM selective encrypted content to the client via a transaction manager.

A method for enabling a single assembly of content to be played on a plurality of player devices, each having at least one available digital rights management (DRM) algorithm, consistent with certain embodiments, involves registering a plurality of player devices associated with a client with a database registry, wherein each of the plurality of player devices is enabled to play content using at least one (DRM) algorithm when an appropriate license has been secured; upon registering the plurality of player devices, registering the one or more associated DRM algorithms with each player device; upon receipt of a request for delivery of specified content to the client, searching the database registry for a list of compatible devices and compatible DRM algorithms for the content; obtaining a plurality of licenses to the content, at least one for each DRM algorithm for the player devices associated with the client; obtaining the content from a content provider; obtaining a shared key from a key generator for the one or more DRM algorithms; and encrypting the content under each of the DRM algorithms using the shared key to produce encrypted content.

In certain embodiments, the method also involves delivering the encrypted content to the client. In certain embodiments, the plurality of licenses is obtained from at least one licensing server. In certain embodiments, the encrypted content is delivered to the client via a transaction manager. A computer readable storage medium storing instructions which, when executed on a programmed processor, can carry out the above process.

In another embodiment consistent with the present invention, a system for enabling a single assembly of content to be played on a plurality of player devices, each having at least one available digital rights management (DRM) algorithm has a database that registers a plurality of player devices associated with a client with a database registry, wherein each of the plurality of player devices is enabled to play content using at least one (DRM) algorithm when an appropriate license has been secured. The database further registers one or more associated DRM algorithms with each player device. A transaction coordinator, upon receipt of a request for delivery of specified content to the client, obtains from the database a list of compatible devices and compatible DRM algorithms for the ordered content. The transaction coordinator further obtains a plurality of licenses to the content, at least one for each DRM algorithm for the player devices associated with the client. A content provider provides the content and a key generator generates a key shared among the DRM algorithms. A DRM packager encrypts the content using the key shared among the DRM algorithms to produce encrypted content.

In certain embodiments, the system also has at least one licensing server that provides a plurality of licenses to the content to the transaction coordinator. In certain embodiments, the system also delivers the encrypted content to the client. In certain embodiments, the DRM packager delivers the encrypted content directly to the client. In certain embodiments, the DRM packager delivers the encrypted content to the client via the transaction manager.

Software and/or firmware embodiments may be implemented using a programmed processor executing programming instructions that in certain instances are broadly described above in flow chart and signal flow diagram form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method for enabling a single assembly of content to be played on a plurality of player devices, each having at least one available digital rights management (DRM) algorithm, wherein the DRM algorithms for the player devices need not necessarily be the same and at least two DRM algorithms for the player devices are different, comprising:

registering, at a programmed processor, a plurality of player devices associated with a client with a database registry, wherein each of the plurality of player devices is enabled to play content using at least one DRM algorithm when an appropriate license has been secured, and wherein at least two DRM algorithms are needed to play content using all of the player devices associated with a client;

upon registering the plurality of player devices, registering the one or more associated DRM algorithms with each player device;

receiving a request for delivery of specified content to the client and in response thereto searching the database registry for a list of compatible devices and compatible DRM algorithms for the content;

obtaining a plurality of licenses to the content, at least one for each DRM algorithm, for the player devices associated with the client;

obtaining the content from a content provider; and encrypting the content under each of the DRM algorithms to produce multiple DRM selectively encrypted content, wherein the multiple DRM selectively encrypted content comprises:
  segments of the specified content that axe unencrypted, and
  selected segments of the content which are duplicated to produce one copy of the selected content for each of the DRM algorithms with each duplicate copy of the selected segments encrypted under a different one of the DRM algorithms, and
  wherein, the unencrypted segments of content are assembled together with each of the DRM encrypted duplicate selected segments to produce a single unified content assembly that can be played on any of the player devices.

2. The method according to claim 1, further comprising delivering the multiple DRM selective encrypted content to the client.

3. The method according to claim 2, wherein the delivering of the content is by at least one of download, streaming or delivery of packaged media.

4. The method according to claim 1, wherein the plurality of licenses are obtained from at least one licensing server.

5. The method according to claim 1, wherein the content is multiple DRM selective encrypted at a DRM packager.

6. The method according to claim 5, wherein the DRM packager delivers the multiple DRM selective encrypted content directly to the client.

7. The method according to claim 5, wherein the DRM packager delivers the multiple DRM selective encrypted content to the client via a transaction manager.

8. A plurality of tangible computer readable storage mediums that store instructions which, when executed on a programmed processor, carry out a method for enabling a single assembly of content to be played on a plurality of player devices, each device having at least one available digital rights management (DRM) algorithm, wherein the DRM algorithms for the player devices need not necessarily be the same and at least two DRM algorithms for the player devices are different, the method comprising:

registering a plurality of player devices associated with a client with a database registry, wherein each of the plurality of player devices is enabled to play content using at least one DRM algorithm when an appropriate license has been secured, and wherein at least two DRM algorithms are needed to play content using all of the player devices associated with a client;

upon registering the plurality of player devices, registering the one or more associated DRM algorithms with each player device;

receiving a request for delivery of specified content to the client and in response thereto searching the database registry for a list of compatible devices and compatible DRM algorithms for the content;

obtaining a plurality of licenses to the content, at least one for each DRM algorithm, for the player devices associated with the client;

obtaining the content from a content provider; and encrypting the content under each of the DRM algorithms to produce multiple DRM selectively encrypted content, wherein the multiple DRM selectively encrypted content comprises:
  segments of the specified content that axe unencrypted, and
  selected segments of the content which are duplicated to produce one copy of the selected content for each of the DRM algorithms with each duplicate copy of the selected segments encrypted under a different one of the DRM algorithms, and
  wherein, the unencrypted segments of content are assembled together with each of the DRM encrypted duplicate selected segments to produce a single unified content assembly that can be played on any of the player devices.

9. A method for enabling a single assembly of content to be played on a plurality of player devices, each having at least one available digital rights management (DRM) algorithm, wherein the DRM algorithms for the player devices need not necessarily be the same and at least two DRM algorithms for the player devices are different, comprising:

registering, at a programmed processor, a plurality of player devices associated with a client with a database registry, wherein each of the plurality of player devices is enabled to play content using at least one DRM algorithm when an appropriate license has been secured, and wherein at least two DRM algorithms are needed to play content using all of the player devices associated with a client;

upon registering the plurality of player devices: registering the one or more associated DRM algorithms with each player device;

receiving a request for delivery of specified content to the client and in response thereto searching the database registry for a list of compatible devices and compatible DRM algorithms for the content;

obtaining a plurality of licenses to the content from at least one license server, at least one for each DRM algorithm for the player devices associated with the client;

obtaining the content from a content provider; and at a DRM packager, encrypting the content under each of the DRM algorithms to produce multiple DRM selectively encrypted content, wherein the multiple DRM selectively encrypted content comprises:
  segments of the specified content that are unencrypted, and
  selected segments of the content which are duplicated to produce one copy of the selected content for each of the DRM algorithms with each duplicate copy of the selected segments encrypted under a different one of the DRM algorithms, and
  wherein, the unencrypted segments of content are assembled together with each of the DRM encrypted duplicate selected segments to produce a single unified content assembly that can be played on any of the player devices;

the DRM packager electronically delivering the multiple DRM selectively encrypted content directly to the client by either download or streaming.

10. A system of networked components for enabling a single assembly of content to be played on a plurality of player devices, each having at least one available digital rights management (DRM) algorithm, wherein the DRM algorithms for the player devices need not necessarily be the same and at least two DRM algorithms for the player devices are different, comprising:
 a memory that stores a database, said database registers a plurality of player devices associated with a client with a database registry, wherein each of the plurality of player devices is enabled to play content using at least one DRM algorithm when an appropriate license has been secured;
 wherein, the database further operates to register one or more associated DRM algorithms with each player device;
 a transaction coordinator that receives a request for delivery of specified content to the client, and in response thereto obtains from the database a list of compatible devices and compatible DRM algorithms for the ordered content, wherein at least two DRM algorithms for the player devices associated with the client are different;
 wherein, the transaction coordinator further operates to obtain a plurality of licenses to the content, at least one for each DRM algorithm for the player devices associated with the client;
 a content provider that provides the content; and
 a DRM packager that encrypts the content under each of the DRM algorithms to produce multiple DRM selectively encrypted content, wherein the multiple DRM selectively encrypted content comprises:
  segments of the specified content that are unencrypted, and
  selected segments of the content which are duplicated to produce one copy of the selected content for each of the DRM algorithms with each duplicate copy of the selected segments encrypted under a different one of the DRM algorithms, and
  wherein, the unencrypted segments of content are assembled together with each of the DRM encrypted duplicate selected segments to produce a single unified content assembly that can be played on any of the player devices.

11. The system according to claim 10, further comprising at least one licensing server that provides a plurality of licenses to the content to the transaction coordinator.

12. The system according to claim 10, further comprising means for delivering the multiple DRM selective encrypted content to the client.

13. The system according to claim 12, wherein the delivering of the content is by at least one of download, streaming or delivery of packaged media.

14. The system according to claim 10, wherein the DRM packager delivers the multiple DRM selective encrypted content directly to the client.

15. The system according to claim 10, wherein the DRM packager delivers the multiple DRM selective encrypted content to the client via the transaction manager.

16. The system according to claim 10, wherein the database operates under control of the transaction manager.

17. The system according to claim 10, wherein the transaction manager, DRM packager and license server operate under control of the content provider.

18. The system according to claim 10, wherein the DRM packager operates under control of the content provider.

19. A system of networked components for enabling a single assembly of content to be played on a plurality of player devices, each having at least one available digital rights management (DRM) algorithm, wherein the DRM algorithms for the player devices need not necessarily be the same and at least two DRM algorithms for the player devices are different, comprising:
 a memory that stores a database, said database registers a plurality of player devices associated with a client with a database registry, wherein each of the plurality of player devices is enabled to play content using at least one DRM algorithm when an appropriate license has been secured;
 wherein, the database further operates to register one or more associated DRM algorithms with each player device and at least two DRM algorithms for the player devices associated with the client are different;
 a transaction coordinator that receives a request for delivery of specified content to the client and obtains from the database a list of compatible devices and compatible DRM algorithms for fine ordered content;
 wherein, the transaction coordinator further obtains a plurality of licenses to the content, at least one for each DRM algorithm for the player devices associated with the client;
 a content provider that provides the content; and
 a DRM packager that encrypts the content under each of the DRM algorithms to produce multiple DRM selectively encrypted content, wherein the multiple DRM selectively encrypted content comprises:
  segments of the specified content that are unencrypted, and
  selected segments of the content which are duplicated to produce one copy of the selected content for each of the DRM algorithms with each duplicate copy of the selected segments encrypted under a different one of the DRM algorithms, and
  wherein, the unencrypted segments of content are assembled together with each of the DRM encrypted duplicate selected segments to produce a single unified content assembly that can be played on any of the player devices;
 at least one licensing server that provides a plurality of licenses to the content to the transaction coordinator;
 wherein said DRM packager delivers the multiple DRM selectively encrypted content to the client by at least one of download, streaming, or delivery of packaged media.

20. The system according to claim 19, wherein the DRM packager delivers the multiple DRM selective encrypted content directly to the client.

21. The system according to claim 19, wherein the DRM packager delivers the multiple DRM selective encrypted content to the client via the transaction manager.

22. The system according to claim 19, wherein the database operates under control of the transaction manager.

23. The system according to claim 19, wherein the transaction manager, DRM packager and license server operate under control of the content provider.

24. The system according to claim 19, wherein the DRM packager operates under control of the content provider.

* * * * *